(12) United States Patent
Huang et al.

(10) Patent No.: US 10,943,458 B2
(45) Date of Patent: Mar. 9, 2021

(54) MARATHON TIMING AND REAL-TIME ACCIDENT NOTIFICATION METHOD AND SYSTEM THEREOF

(71) Applicant: Jung-Tang Huang, Taipei (TW)

(72) Inventors: Jung Tang Huang, Taipei (TW); Chun-I Sun, New Taipei (TW)

(*) Notice: Subject to any disclaimer, the term of this patent is extended or adjusted under 35 U.S.C. 154(b) by 0 days.

(21) Appl. No.: 16/794,278

(22) Filed: Feb. 19, 2020

(65) Prior Publication Data
US 2020/0327789 A1    Oct. 15, 2020

Related U.S. Application Data (63) Continuation of application No. 62/808,310, filed on Feb. 21, 2019.

(51) Int. Cl.
| | |
|---|---|
| G08B 21/04 | (2006.01) |
| G08B 31/00 | (2006.01) |
| G07C 1/22 | (2006.01) |
| G08B 25/10 | (2006.01) |
| H04W 4/90 | (2018.01) |

(52) U.S. Cl.
CPC ........... G08B 21/0453 (2013.01); G07C 1/22 (2013.01); G08B 25/10 (2013.01); G08B 31/00 (2013.01); H04W 4/90 (2018.02)

(58) Field of Classification Search
CPC combination set(s) only.
See application file for complete search history.

(56) References Cited

U.S. PATENT DOCUMENTS

| | | | | |
|---|---|---|---|---|
| 2014/0125481 | A1* | 5/2014 | Utter, II | G06F 19/3418 340/539.12 |
| 2014/0306821 | A1* | 10/2014 | Rahman | H04M 1/72569 340/539.11 |

* cited by examiner

*Primary Examiner* — Travis R Hunnings (57) ABSTRACT

A method and system for timing and real-time accident notification of a marathon event comprises of providing a marathon event management system, which has a database connected to a gateway. The gateway is connected with a time synchronization control unit to provide a wearable device to at least one contestant. The wearable device comprises a sensing element for sensing the physiological parameters and environmental parameters of a contestant, and a signal transceiving unit. A start position, a travel area, and an end position are defined in a marathon travel path. A plurality of signal transceivers are distributed and installed on the marathon's travel path to continuously transmit and receive the physiological parameters and the environmental parameters of the wearable device within a cycle time. Each of the signal transceivers includes: a satellite positioning receiving module for receiving GPS positioning data, and receiving at least one control signal from the time synchronization control unit. When the contestant's signal transceiving unit in the travel path senses that the physiological parameter and the environmental parameter exceed a preset value, the signal transceiving unit sends a rescue medical service request signal to at least one of the signal transceivers.

19 Claims, 2 Drawing Sheets

MARATHON TIMING AND REAL-TIME ACCIDENT NOTIFICATION METHOD AND SYSTEM THEREOF

CROSS-REFERENCE TO RELATED APPLICATION

This application claims the right to U.S. Provisional Application No. 62/808,310, titled "Timing/Location System and method thereof" and filed on Feb. 21, 2019. The contents of the above applications are all incorporated by reference as if fully set forth herein in their entirety.

BACKGROUND OF THE INVENTION

1. Field of the Invention

The present invention mainly relates to an event accident prevention method, and more particularly, to an accident prevention method and system for a marathon event that can increase rescue efficiency.

2. Description of Related Art

According to many current sports events, especially today, advocating energy-saving and carbon-saving, the use of manpower to achieve sports purposes is rising. Therefore, swimming, marathon jogging, and triathlon are currently healthy and energy-saving activities. But some of them are long-distance races, which often require a lot of manpower and material resources for monitoring and safety management. In case of unexpected conditions or physical discomfort, the contestants cannot timely and accurately be found at the correct location, which may miss the golden time for rescue and cause unnecessary casualties.

In addition, currently, passive radio frequency identification (RFID) tag is used to wear on athletes such as bracelets, foot rings, buckles or chest number plates, and reader pads are set on the road. The disadvantage is that the response time of RFID usually exceeds 0.1 second, and the time accuracy is one second. Furthermore, even ordinary active communication components, such as conventional Bluetooth, require a pairing setting time of more than 1 second. At present, due to the high price of RFID reader mats, they cannot be installed densely on the track, and the detection mats are only installed every 5 kilometers to track the position and status of contestants in real time. In addition, the passive RFID tag usually cannot provide an emergency button to send a signal for help to rescue units. The passive RFID tag may not also detect personal sports pace and hand swing, and even foot movement rhythm, amplitude, etc. during sports events which have an impact on the quality of the running performance. The passive RFID tag cannot also provide post-marathon analysis and reference for future events, so a device that allows contestants to record individual events clearly has added value. In addition, the conventional event rescue system in marathon is limited by the delay of data transmission, and cannot quickly and accurately find the location of the accident, or the type of the accident cannot be quickly known, resulting in a great lack of rescue.

SUMMARY OF THE INVENTION

The main purpose of the present invention is to provide a marathon timing, and to quickly and accurately find the contestants who have accidents in the event.

First, the invention proposes a method for timing and real-time accident notification of a marathon, comprising:

providing a marathon event management system which has a database connected to a gateway; and the gateway is connected to a time synchronization control unit; the gateway further includes: a satellite positioning receiving module for receiving/transmitting a GPS positioning data to the time synchronization control unit, and at least one control signal sent by the time synchronization control unit to a plurality of signal transceivers arranged on a traveling path;

providing at least one contestant a wearable device which has a sensing element for sensing the physiological parameters and environmental parameters of the contestant, a signal transceiving unit and a power source electrically connecting the sensing element and the transceiving unit;

defining a start position, a travel area, and an end position in the marathon's travel path;

wherein a plurality of signal transceivers is arranged on the traveling paths to continuously transmit and receive the physiological parameters and the environmental parameters of the wearable device within a cycle time; when the contestant passes any signal transceiver in the travel path, the signal transceiver may actively judge the RF intensity signals generated by the contestant during the cycle time. When the multiple RF intensity signals occur at least one with attenuation, and the attenuation value of any one of the RF strength signals exceeds a threshold value, then the time point at which the contestant passes the signal transceiver is calculated.

In an embodiment of the present invention, the method further comprises:

sending a rescue medical service request are converted into a data packet and transmitted to a cloud management system, based on the signal abnormity of the sensed physiological parameters and environmental parameters.

In an embodiment of the present invention, the method further comprises:

capturing at least one cadence data of the contestant based on the data packet which the wearable device uses a calculation program to determine the at least one cadence data of the contestant, and integrates the at least one cadence information into a physiological parameter.

In an embodiment of the present invention, the wearing device further includes:

a behavior detection module for capturing the at least one cadence data of the contestant; and a behavior learning module is used to analyze whether the contestant has an accident according to the at least one cadence data, the physiological parameter and the environmental parameter.

In one embodiment of the present invention, the physiological parameter includes at least one or a combination of a contestant's heartbeat information, blood glucose information, body temperature information, blood oxygenation information, and body posture information.

In an embodiment of the present invention, the environmental parameters include at least one or a combination of longitude information, latitude information, altitude information, temperature information, and humidity information.

In an embodiment of the present invention, the wearable device further includes a storage element for storing identity information, the physiological parameter and the environmental parameter of the contestant.

In an embodiment of the present invention, the cycle time is between 5 ms and 30 ms.

In an embodiment of the present invention, the signal transmitting and receiving unit performs transmission and reception through a Bluetooth, a Bluetooth low energy signal, a WIFI signal, an LTE signal or a 5G signal.

In an embodiment of the present invention, the time synchronization control unit sends a time synchronization control signal to the gateway every 1 second to 30 minutes, and the gateway sends the time synchronization control signal at the same time to those signal transceivers.

Secondly, the present invention proposes another method for timing and real-time notification of marathon events, comprising:

providing a marathon event management system. The marathon event management system has a database connected to a gateway; and the gateway is connected to a time synchronization control unit; the gateway further includes:

a satellite positioning receiving module for receiving/transmitting a GPS positioning data to the time synchronization control unit, and at least one control signal sent by the time synchronization control unit to a plurality of signal transceivers arranged on a traveling path;

providing a wearable device to at least one contestant, wherein the wearable device has a sensing element for sensing the physiological parameters and environmental parameters of the contestant, a signal transceiving unit and a power source electrically connecting the sensing element and the transceiving unit;

defining a start position, a travel area, and an end position in the marathon's travel path; wherein a plurality of signal transceivers are arranged on the traveling paths to continuously transmit and receive the physiological parameters and the environmental parameters of the wearable device within a cycle time. When the contestant's signal transceiving unit in the travel path senses that the physiological parameter and the environmental parameter exceed a preset value, the signal transceiving unit sends a rescue medical service to at least one of the signal transceivers request signal, and when the contestant passes any signal transceiver in the travel path, the signal transceiver may actively determine the RF intensity signal generated by the contestant during the cycle time. When the multiple RF intensity signals occur at least one with attenuation, and the attenuation value of any one of the RF strength signals exceeds a threshold value, then the time point at which the contestant passes the signal transceiver is calculated.

In an embodiment of the present invention, the method further comprises:

sending a rescue medical service request are converted into a data packet and transmitted to a cloud management system, based on the signal abnormity of the sensed physiological parameters and environmental parameters.

In an embodiment of the present invention, the method further comprises:

capturing at least one cadence data of the contestant based on the data packet which the wearable device uses a calculation program to determine the at least one cadence data of the contestant, and integrates the at least one cadence information into a physiological parameter.

In an embodiment of the present invention, the wearing device further includes:

a behavior detection module for capturing the at least one step data of the contestant; and a behavior learning module is used to analyze whether the contestant has an accident according to the at least one cadence data, the physiological parameter and the environmental parameter.

In one embodiment of the present invention, the physiological parameter includes at least one or a combination of a contestant's heartbeat information, blood glucose information, body temperature information, blood oxygenation information, and body posture information.

In an embodiment of the present invention, the environmental parameters include at least one or a combination of longitude information, latitude information, altitude information, temperature information, and humidity information.

In an embodiment of the present invention, the wearable device further includes a storage element for storing identity information, the physiological parameter and the environmental parameter of the contestant.

In an embodiment of the present invention, the cycle time is between 5 ms and 30 ms.

In an embodiment of the present invention, the signal transmitting and receiving unit performs transmission and reception through a Bluetooth, a Bluetooth low energy signal, a WIFI signal, an LTE signal or a 5G signal.

In one embodiment of the present invention, the time synchronization control unit sends a time synchronization control signal to the gateway every 1 second to 30 minutes, and the gateway sends the time synchronization control signal at the same time to these signal transceivers.

Furthermore, the present invention provides a timing and real-time accident notification system for marathon events, comprising a marathon event management system which has a database connected to a gateway; and the gateway is connected to a time synchronization control unit; the gateway further comprises:

a satellite positioning receiving module for receiving/transmitting a GPS positioning data to the time synchronization control unit, and at least one control signal sent by the time synchronization control unit to a plurality of signal transceivers arranged on a traveling path; when the contestant's signal transceiving unit in the travel path senses that the physiological parameter and the environmental parameter exceed a preset value, the signal transceiving unit sends a rescue medical service request signal to at least one of the signal transceivers; and a wearable device comprises:

one power supply;

a processor electrically connected to the power source;

a sensing element for sensing a physiological parameter and an environmental parameter of a contestant, and the sensing element is electrically connected to the power source;

a storage unit for storing at least the physiological parameters and the environmental parameters sensed by the contestant; and a signal transceiving unit for continuously transceiving the physiological parameters and the environmental parameters of the wearable device within a cycle time.

The travel path includes at least a start position, a travel area, and an end position. The signal transceivers disposed on the travel path are used to continuously transmit and receive the physiological parameters and the environmental parameters of the wearable device within a cycle time. When the contestant appears in the travel path that the physiological parameter and the environmental parameter exceed a preset value, the signal transceiver unit sends a rescue medical service request signal to at least one of the signal transceivers, and when the contestant passes any signal transceiver in the travel path, the signal transceiver will actively judge the RF intensity signals generated by the contestant during the cycle time. When the plurality of RF intensity signals are attenuated at least once, and if the attenuation value of any one of the RF strength signals exceeds a threshold value, the time point of the contestant passing through the signal transceiver is calculated.

The present invention also provides another marathon timing and real-time accident notification system, comprising:

a marathon event management system which has a database connected to a gateway; and the gateway is connected to a time synchronization control unit; the gateway further includes:

a satellite positioning receiving module for receiving/transmitting a GPS positioning data to the time synchronization control unit, and at least one control signal sent by the time synchronization control unit to a plurality of signal transceivers arranged on a traveling path; when the contestant's signal transceiving unit in the travel path senses that the physiological parameter and the environmental parameter exceed a preset value, the signal transceiving unit sends a rescue medical service request signal to at least one of the signal transceivers, and a wearable device comprises:
one power supply;
a processor electrically connected to the power source;
a sensing element for sensing a physiological parameter and an environmental parameter of a contestant, and the sensing element is electrically connected to the power source;
a storage unit for storing at least the physiological parameters and the environmental parameters sensed by the contestant; and
a signal transceiving unit for continuously transceiving the physiological parameters and the environmental parameters of the wearable device within a cycle time.

The travel path includes at least a start position, a travel area, and an end position. The signal transceivers disposed on the travel path are used to continuously transmit and receive the physiological parameters and the environmental parameters of the wearable device within a cycle time; when the contestant appears in the travel path that the physiological parameter and the environmental parameter exceed a preset value, the contestant sends the physiological parameter and the environmental parameter of the wearable device and/or a rescue medical service request signal to a wearing device of the other contestant passing the said contestant's position; and When the other contestant passes any signal transceiver in the travel path, the signal transceiver will actively determine the RF intensity signal generated by the other contestant during the multiple cycle times. Attenuation of the RF intensity signal occurs at least once, and the attenuation value of any one of the RF intensity signals exceeds a threshold value, the time point at which the other contestant passes the signal transceiver is calculated.

In summary, the present invention provides a marathon event timing and real-time accident notification system. A wearable device passes a signal transceiver in a race path, and the signal transceiver receives a time synchronization control signal from a gateway. By this way, it reduces inaccurate timing of events, inaccurate position analysis calculations, and delays in accident rescue due to time out of sync.

In order to make the above features and advantages of the present invention more comprehensible, embodiments are described below in detail with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The following is a description of specific embodiments to describe the implementation of the "marathon timing and real-time accident notification method and system" disclosed by the present invention. Those skilled in the art can understand the advantages and effects of the present invention from the content disclosed in this description. The present invention can be implemented or applied through other different specific embodiments, and various details in this specification can also be based on different viewpoints and applications, and various modifications and changes can be made without departing from the concept of the present invention. In addition, the drawings of the present invention are merely a schematic illustration, and are not drawn according to actual dimensions, and are stated in advance. The following embodiments will further describe the related technical content of the present invention in detail, but the disclosed content is not intended to limit the protection scope of the present invention.

It should be understood that although the terms first, second, third, etc. may be used herein to describe various elements or signals, these elements or signals should not be limited by these terms. These terms are mainly used to distinguish one element from another element, or a signal from another signal. In addition, the term "or" as used herein should, depending on the actual situation, include any one or more of the associated listed items.

Figure 1:
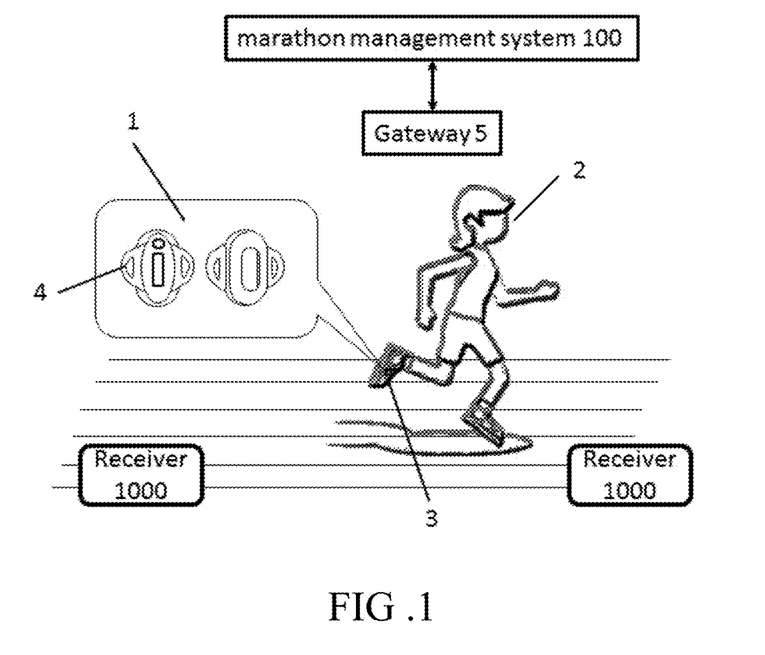
FIG. 1 is a schematic diagram of a wearable device of the present invention being worn by a contestant for an event.
Figure 2:
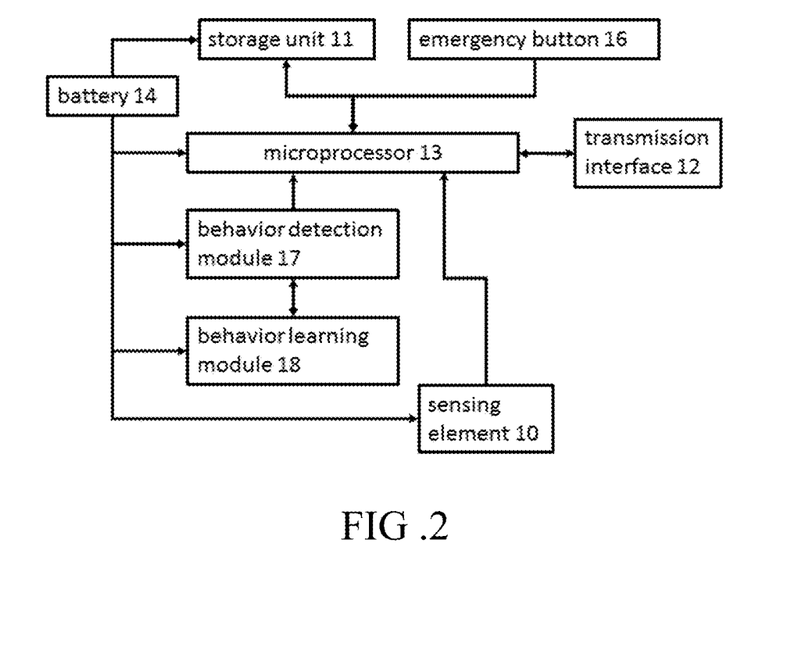
FIG. 2 is a schematic diagram of a wearable device of the present invention.

As shown in FIGS. 1 and 2, at least one contestant runs a marathon on a runway. The contestant wears a wearable device 1. The marathon is monitored and managed by a marathon management system 100 to confirm whether a contestant 2 is competing in the planned travel path in the management system. The travel path includes at least a start position, an end position, and a travel area between the start position and the end position, so that each contestant 2 can start the game from the start position, and pass the travel area to the end position. The system can calculate the time for each contestant 2 to pass the end position to rank each contestant 2 in the race. The marathon management system 100 includes a database, which contains at least one contestant's data. The data may include the name, gender, date of birth, age, etc. of the contestant. In addition, the marathon management system 100 is connected via a communication device (such as the gateway 5); a plurality of signal transceivers are provided at the start position, the travel area and the end position (a signal is set between each preset position, such as: set every 500 meters from the start position to the end position). The transceivers are connected to the database via the communication device. The communication device may be a WIFI gateway, 4G, 5G, NBIOT/LTE or LORA device, and the communication system is used to connect to a satellite positioning system. In addition, FIG. 1 further discloses that each contestant 2 wears a wearable device 1. The wearable device 1 can be connected to any signal transceiver via the wireless communication device. The signal transceiver may upload the data captured by the wearable device 1 to the marathon management system 100. It should be noted that the wearable device 1 may be a watch, a bracelet, a bracelet, or clothing or a shoelace (such as strap 3), which may be worn on a contestant's hand, or may be the device which makes physical contact with the skin of the contestant 2.

Please continue to refer to FIG. 2. FIG. 2 is a schematic diagram of a wearable device 1, which is composed of a battery 14, a microprocessor 13, a storage unit 11, and a transmission interface 12. In some embodiments, it may further include at least one sensing element 10, and an emergency button 16. The above components are carried by a substrate, and electrically connected. The sensing element 10 of the wearing device 1 is used to sense the motion signal of the wearer, and the battery 14 is used to provide other components power. The storage unit 11 is for recording the number plate of the contestant 2. It can also record the photo of the contestant 2, the start time, end time, number of trips, and motion records in the process, such as the multi-axis acceleration values of limbs or body swing. The microprocessor 13 controls the sensing elements 10, the storage unit 11, and the transmission interface 12.

From another perspective of the present invention, in addition to sensing the physiological parameters of the contestant 2, the sensing element 10 can also sense the environmental parameters of the contestant 2. The physiological parameters are at least one or a combination of, for example, heartbeat, blood oxygen, blood pressure, blood glucose, lactate acid, and body temperature. The environmental parameter is, for example, a signal transmitting and receiving device for receiving a satellite positioning information to measure the coordinate position of the contestant 2. The sensing element 10 may be a multifunctional type, thus, the parameters about inertial motion can be selected from accelerometer, gyroscope, digital compass, altimeter; or other environmental parameters such as a longitude, a latitude, a height, an environmental noise, an air temperature, and a humidity can be selected from GPS, barometer, microphone, thermometer, hygrometer, etc., at least one or a combination. However, the present invention is not limited to the above-mentioned various parameters, and should also cover in other specific implementation states.

Figure 4:
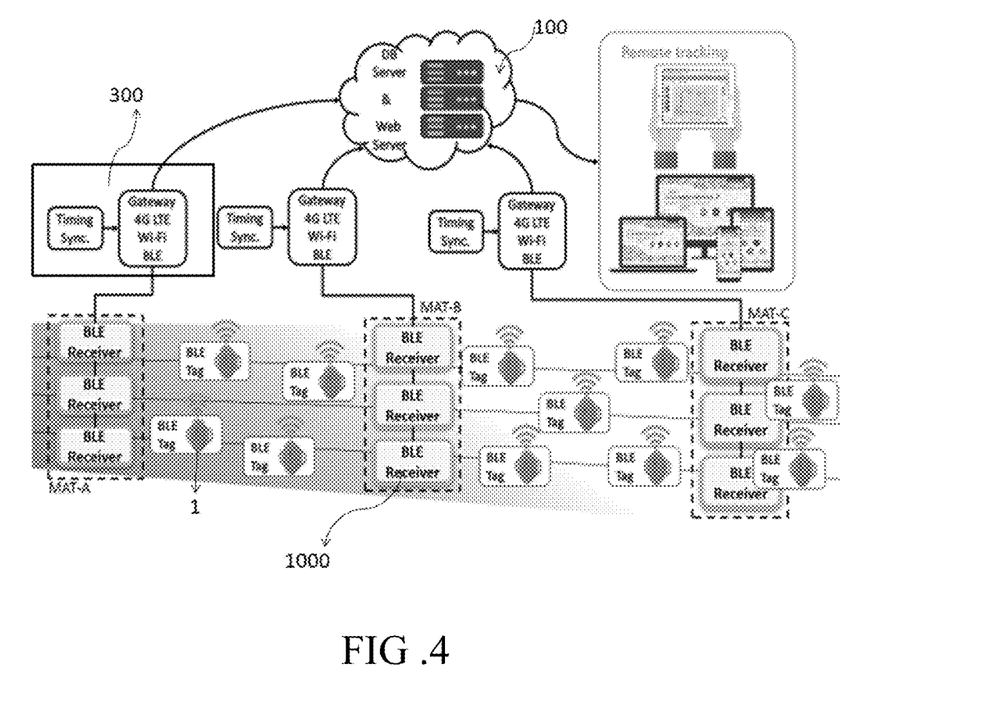
FIG. 4 is an overall system configuration diagram of the present invention applied to a sports event.

In addition, as can be seen from FIG. 2, the wearable device 1 may further include function of obtaining information such as the cadence data of the contestant 2 and the posture of the movement. Accordingly, the wearable device 1 may further include a behavior detection module 17 for capturing the at least one cadence data of the contestant 2; and a behavior learning module 18 for analyzing whether the contestant has an accident based on the at least the cadence data, the physiological parameters and the environmental parameters. For example, if the contestant wears the wearable device through the starting position and moves to the end position in the travel path, the wearable device will interact with the marathon event management system 100 and any signal transceiver 1000 in the travel path as shown in FIG. 4. The wearable device 1 further wirelessly transmits and receives various information with the signal transceiver 1000. When the contestant 2 has an accident (such as a fall, cramps, insufficient blood oxygen concentration, etc.) during the event, the wearable device 1 may actively broadcast to the nearest signal transceiver 1000 to send a rescue medical service request signal, or the rescue medical service request signal is transmitted to at least one other contestant passing through the location of the contestant in the accident. Another feasible method in this embodiment is that the contestant in the accident can press the emergency button 16 of the wearable device 1 to transmit a rescue medical service request signal.

Here is another embodiment. Please refer to FIG. 1 to FIG. 3. When the contestant 2 moves to the end position in the travel path, the wearable device 1 worn by the contestant 2 actively communicates with the signal transceiver 1000. Among them, the signal transceiver 1000 is connected to the marathon event management system 100 through a gateway (5, 300). Each gateway (5, 300) includes a GPS receiving module 310 for receiving a GPS signal. The gateway (5, 300) also includes a power module 340 and a time synchronization controller 330. The GPS receiving module 310, the time synchronization controller 330, and the power supply module 340 are electrically connected. Every 1 second to 30 minutes, the gateway 300 will actively send a time synchronization control signal to each signal transceiver 1000 of the traveling paths. Each signal transceiver 1000 requires simultaneous time synchronization control. To ensure that each signal transceiver will not cause a time delay due to the frequent exchange of data from the gateway to the marathon-event management system, thereby increasing the timing accuracy and reducing the inaccurate calculation of the accident location of the contestants, consequently improving rescue overall efficiency. Furthermore, a plurality of signal transceivers 1000 are provided on the marathon's travel path to continuously transmit and receive the physiological parameters and the environmental parameters of the wearable device 1 within a cycle time. At least one of the signal transceivers includes a satellite positioning receiving module (not shown) for receiving a GPS positioning data and at least one control signal from the time synchronization control unit 330; wherein the plurality of signal transceivers 1000 may receive each broadcasting parameter of the wearable device 1, and these parameters are transmitted to the marathon event management system 100 through the gateway (5, 300). When the signal transceiving unit 12 in the wearable device 1 of the contestant 2 in the travel path senses the physiological parameter and the environmental parameter exceeds a preset value, the detected parameter value is passed through the transmission interface 12 to the microprocessor 13. The microprocessor 13 confirms whether the event exceeds a preset value, and if so, it will ask the signal transceiver unit 12 to send a rescue medical service request signal to at least one of the signal transceivers 1000. For example, when the contestant falls, the accelerometer of the wearable device 1 may not detect that the contestant has moved; or if the contestant's pace is significantly different from the previous time period. The rescue medical service request signal can also be transmitted to at least one other contestant who passed the position of the contestant with an accident; therefore, the said other contestant will pass the rescue medical service request signal to the next signal transceiver 1000 and then provide it to the marathon system 100 through the gateway 5. In addition, the behavior detection module 17 mentioned in the wearable device 1 may detect the position of the next second or detect the contestant's activity information through the GPS signal during the contestant's exercise. The behavior learning module 18 is configured to analyze whether the contestant has an accident according to the abnormality of at least a cadence data, a physiological parameter, or an environmental parameter.

Figure 3:
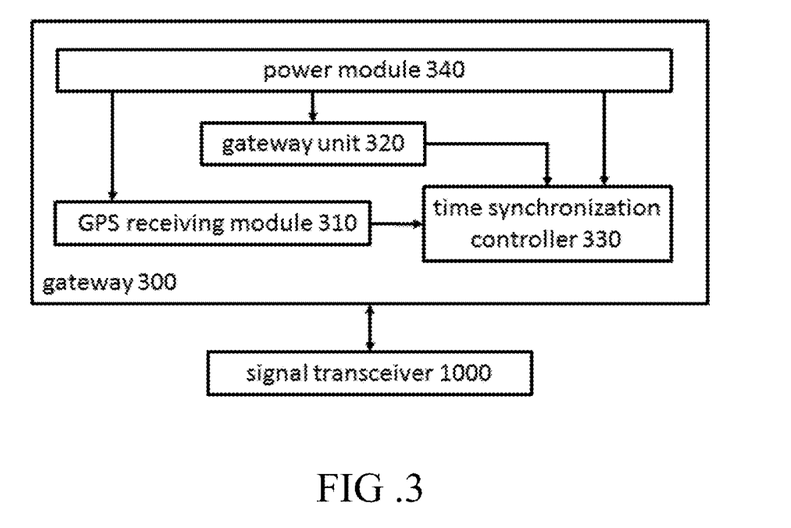
FIG. 3 is a schematic diagram of the connection between the real-time event notification system and the marathon management system of the present invention.

Please refer to FIGS. 1 to 3. FIG. 3 describes the gateway 300 as a communication medium between the marathon management system 100 and the signal transceiver 1000. The gateway 300 includes a power module 340 as the power source of each unit of the gateway 300, a GPS receiving module 310 for receiving GPS signals. The GPS receiving module 310 is electrically connected to a gateway unit 320 and a time synchronization controller 330. The time synchronization controller 330 sends out a time synchronization control signal every 1 second to 30 minutes, and sends the signal to each signal transceiver 1000 located on the travel paths through a gateway unit 320. Each signal transceiver 1000 can correct the time to avoid the problem that the time of the signal transceiver 1000 is not synchronized. It should be noted that the present invention does not limit the signal types of the signal transceivers. In any feasible embodiment in the present application, the signals may be WIFI signals, 4G, 5G, NBIOT/LTE or LORA signal, millimeter wave signal, Bluetooth signal or Bluetooth low energy signal, etc.

Please refer to FIG. 4. FIG. 4 is only an exemplary embodiment of the present invention. In this embodiment, a plurality of signal transceivers 1000 are provided in a race track. The signal transceiver 1000 can be integrated in a mat (such as: MAT A, MAT B, etc. . . . ). In marathon, each contestant is required to bring a wearable device 1, such as a wearable device with a signal transceiver, for example, a Bluetooth Low Energy transceiver (abbreviated as BLE Tag), and then a starting mat, an end mat, and mats also equipped with several Bluetooth transceivers (referred to as a BLE Mat) connected in series across the width of the track. The BLE Mats are installed on the track at approximately every 500 meters. When the race is underway and the contestants cross each BLE Mat, the Mat detects the passage time of the contestants. The error is ±156 ms when analyzed with 6 standard deviations. When each BLE Mat sends data information from its serial communication device to the cloud server via wireless network, the server analyzes the performance of each contestant or presents relevant information in real time. During the competition, the contestants start from the starting line to the finish line, and they cross each fixed-point BLE Mats one by one. At this time, the BLE Tag carried by the contestant may periodically broadcast the contestant's information and related information, for example, as the contestant runs and broadcasts along the track. When a contestant passes each BLE Mat on the track in sequence, the BLE Mat will receive multiple related broadcast messages in sequence. The BLE Mat actively distinguishes multiple RF intensity signals generated by a contestant. When multiple intensity RF signals of any contestant are attenuated at least once and the attenuation value of the RF signal of any intensity exceeds a threshold, the timing of the contestant is calculated. At the time when the contestant passed the signal transceiver, the BLE Tag broadcast information and time carried by the contestant were uploaded to the cloud server together.

In another embodiment of the present invention, the contestant travels from the start point to the end point. A plurality of signal transceivers 1000 are provided in the travel path. Multiple signal transceivers 1000 may be distributed in a long mat (such as: MAT A, MAT B, etc.). Assume that when a contestant passes the first mat MAT A from the starting point, the mat (with several signal transceivers) may actively determine that the contestant's Received Signal Strength Indication (RSSI) generated during the cycle time. When the multiple RF strength signals increase from weak, it means that the contestant is getting closer to the mat MAT A, but when the contestant has already passed through the mat, one of the RF intensity signals at this time will be greatly reduced from strong, that is, at least one significant attenuation occurs (for example, at least twice the attenuation of the RF intensity signals received in the previous two times). And the attenuation value of any one of the RF strength signals exceeds a threshold value, the time point of the contestant passing through the signal transceiver is calculated.

When the contestant has passed by the other contestants who are to be rescued, the BLE Tag carried by him will receive the information from the contestants who are being rescued and act as the transfer carrier for the temporary rescue message. The information includes:

(1) The BLE Tag number of the contestant to be rescued;

(2) The contestants who are represented by the time serial number of the contestants who are to be rescued are now initiating the launch time message;

(3) Reference information of the receiving time and place indicated by the carrier's time serial number. When the carrier passes the next BLE Mat, the aforementioned information is transmitted, and it also contains the current time serial number of the entrusted carrier.

Embodiment One

1. The BLE Tag performs a broadcast function every 20 ms. The broadcast packet contains a periodic sequence number SN_Now. At each period, SN_Now increases by a value of 1, ranging from 0x0000 to 0xFFFF, so it loops every 21 minutes and 50.72 seconds, which can span a distance of about 1 km for walking, or a distance of about 7 km for running;

{A_ID, SN_Now, Power_Level}: broadcast packet information;

Wherein

A_ID: ID number of the contestant;

SN_Now: increase by 1 every 20 ms;

Power_Level: represents the battery power of the BLE Tag itself.

2. When the rescue is needed, the contestant directly presses the help button on the BLE Tag. At this time, the BLE Tag broadcast signal will initialize the rescue message. In addition to sending a broadcast signal, and after completing the broadcast action, the BLE Tag will switch to connection mode to search for nearby BLE tags. When it finds the BLE Tag carried by other contestants, it will connect and pass the relevant information that it needs rescue. The BLE Tag for help will continue to repeat the above steps of searching, connecting to deliver the help message, and then disconnecting for 20 minutes continuously.

{R_ID, SN_Now, Power_Level, SN_Req}: rescue message;

Wherein

R_ID: ID number of the contestant for help;

SN_Req: The broadcast adds a message containing the time sequence number when the call for help was initiated.

The carrier BLE Tag broadcasts message containing the rescue message passed down as follows {A_ID, SN_Now, Power_Level, SN_Then, R_ID, SN_Req}:

Wherein

SN_Then: When a rescue request message is received at SN_Then time.

Embodiment Two

Please continue to refer to FIG. 4. The BLE Mat containing BLE transceivers is installed at the starting point, end point, and distance of every 500 meters on the track. It is equipped with gateways and 4G MiFi/LTE communication devices to help pass messages to the system cloud server. It also includes the network time protocol NTP (Network Timing Protocol) and the pulse-per-second (PPS) signal/GPS timing mechanism per second. In order to implement the rescue mechanism, each group of BLE Mats must first be set its position, latitude, longitude and mileage relative to the track. When the race is underway, if a message with a help signal is received directly, it indicates that a contestant needs help. If the relative position of the contestant needing help to the BLE Mat is within 3 m, the message will be directly transmitted to the cloud server; when a rescue request is sent for assistance from other contestants, the rescue message for each carrier closest to the BLE MAT will be collected and uploaded to a cloud server. All uploaded messages include precise time information.

{mss.sss, A_ID, SN_Now, Power_Level}
{mss.sss, R_ID, SN_Now, Power_Level, SN_Req}
{mss.sss, A_ID, SN_Now, Power_Level, SN_Then, R_ID, SN_Req} mss.sss: the message sent by BLE Mats includes the passing time of the contestants When the server receives a rescue request signal for the contestant who needs to be rescued, the server uses the position estimation algorithm of the contestants to be rescued to locate and estimate the position coordinates of the contestant who needs to be rescued, which may be displayed in real-time with the appropriate web interface. In addition to the web interface used for this marathon rescue communication, real-time monitoring of distress messages and relative information, the web server may also be accompanied by other information displays, including contestant position estimation, speed analysis, and BLE Tag carried by each contestant, the status of the BLE Mat on the track, and the start and finish records.

The calculation procedure and description of position estimation algorithm are as follows:

When the position of the contestant to be rescued is on the straight line connection between the two consecutive BLE Mats with fixed-point transceivers on the track, the relative distance ratio of the contestant to be rescued to the next BLE Mat is estimated first according to the time sequence of the carrier. Similar to the concept of triangle, the longitude and latitude of the contestants to be rescued are obtained.

When the track section where the contestant is to be rescued is in a curve situation, that is, it is not on the straight line connecting the two consecutive BLE Mats with fixed-point transceivers. The coordinate estimation method must first divide the curved track into multiple straight lines or sections. The coordinates, kilometers and proportion of each turning point are first measured and calculated according to the actual route. Then, the estimated section number where the contestant to be rescued is calculated based on time. Query which section the position falls in, and then coordinate with the parameters of the table to find the latitude and longitude coordinates of the rescue requester. Furthermore, in the actual marathon event, a contestant needs temporary rescue when an injury occurs, and the call for help is activated, the following runners come from different distances of the track, and pass by the contestant called for help. At the same time, the top 10 of the following runners will receive the distress signal by preferentially connecting with the BLE Tag that has started the rescue notification through the BLE Tags worn by the contestants, then, along with this group of contestants who passed rescue messages on behalf of each other. When passing the next BLE Mat, the rescue messages will be delivered to the cloud by the BLE Tags passed on one by one in real time. If the distance between the following runners and the contestant called for help is too long, and the waiting time for the following runners to come over will be long. If the call for help occurs farther from the BLE Mat in front, a longer period of time will also occur for the person carrying the call for help to run past the BLE Mat. If the following runners are close and the call for help is also close to the next BLE Mat, the time for sending help messages in this case will be closer to 0 seconds. Therefore, the longer waiting time situation is that the following contestants are slightly farther away, the help point is just past the previous BLE Mat (more than 10 meters), and the help point is the longest distance from the next BLE Mat (3 meters ago) (487 meters).

Embodiment Three

Please refer to FIGS. 1 to 4. The contestant can also wear a bracelet with a pedometer function and physiological signal measurement functions such as heart rate, blood pressure, blood oxygen, etc., which can record the contestant's physiological signals and detect the heart rate irregularities, or other abnormal physiological signals. The Bluetooth of the bracelet is executed in multi-role mode and broadcasts a data packet (as shown in Table 1) to the BLE Mat every 20 ms. The BLE Mat is set at about 500 meters (here, BLE Mat also referred to as: base station), including the starting base station, multiple base stations on the race path, and the ending base station, so that contestants can pass each base station and have a BLE Mat for accurate timing. The bracelet also continuously scans at the same time to obtain the longitude and latitude broadcast packets of the base station (as shown in Table 2), because each base station has at least one BLE module in the Slave role, which is responsible for broadcasting the basic information of the base station (as shown in Table 2).

In addition to helping with timing, the data packet in Table 1 can also be uploaded to the cloud through the communication equipment or gateway in each base station, which allows the cloud to calculate whether the cadence of a certain contestant has changed, or whether he is fatigued, or whether it is related to the physiological signal or the location of the race path, because the distance from the contestant to the current base station divided by the number of steps is the step size, and the number of steps divided by the time difference between the two base stations is cadence. This can be used as the basis for pace.

Knowing the location of each base station in the cloud, the cloud can perform AI analysis based on the data packet of the runner's from Table 1, and analyze the characteristics of each runner, perform the group's running behavior, and provide the results of the analysis to each runner.

After the marathon, each runner gets at least 84 pieces of data (including physiological data, steps, cadence, etc.) in the cloud, and the cloud may use AI analysis to infer many race-related data.

TABLE 1 regular data packet broadcasted by the bracelet of the contestant

| recognition code 2 byte | MAC address 6 byte | time 3 byte | place 4 byte | thing 2 byte | thing 1 byte | thing 1 byte | thing 2 byte |
|---|---|---|---|---|---|---|---|
| $R | | hour minute second HH MM SS | latitude and longitude of previous base station | step number counted from previous base station | heart rate 0-255 | blood oxygen 0-100 | blood pressure 0-255 0-255 |

TABLE 2 data packet broadcasted by the base station

| recognition code 2 byte | MAC address 6 byte | time 3 byte | place 4 byte | place 4 byte | place 4 byte |
|---|---|---|---|---|---|
| %B Base Station | | hour minute second | latitude and longitude | latitude and longitude | latitude and longitude |

TABLE 2-continued data packet broadcasted by the base station

| recognition code 2 byte | MAC address 6 byte | time 3 byte | place 4 byte | place 4 byte | place 4 byte |
|---|---|---|---|---|---|
| | | HH MM SS | of current base station | of previous base station | of next base station |

The bracelet scans the data packets provided by the base station in Table 2 to obtain the latitude and longitude of the previous, current, and next base stations. Each bracelet can use the pedometer to estimate its own position, because it can use the location-based MESH network technology (for this technology, see US 20170104834A, the content of the patent is not repeated here). Therefore, the contestants between the two base stations can assist to send the help signal by hopping to the nearest BLE Mat.

The bracelet of this embodiment executes the message transmission of the contestants for help, which is described as follows:

1. Contestants can push the emergency button, and broadcast the emergency help packet (see Table 3) containing the base station's latitude and longitude, step count, heart rate, and bracelet MAC address. Once the nearest BLE Mat and the cloud directly receive the emergency help packet, the cloud can calculate the step count×step size or distance away from the previous base station latitude and longitude, and then bring it into the map to estimate the position of the contestants who need to be rescued.

2. At the same time, other contestants passing by can also scan the emergency help data packet (see Table 3) during the running process, then, store and carry the data to the next base station, or directly hop to other runners, transfer to the nearest BLE Mat, and upload to Cloud.

3. The step size is the average value obtained from the previous uploads.

TABLE 3 data packet for a contestant pressing the help button

| recognition code 2 byte | MAC address 6 byte | time 3 byte | place 4 byte | thing 2 byte | thing 1 byte | thing 1 byte | thing 2 byte |
|---|---|---|---|---|---|---|---|
| $0 SOS | | hour minute second HH MM SS | latitude and longitude of previous base station | step number counted from previous base station | heart rate 0-255 | blood oxygen 0-100 | blood pressure 0-255 0-255 |

If the contestants have disordered pace, arrhythmia, abnormal blood pressure, abnormal blood oxygen, etc., their bracelets can use the state machine technology and AI analysis to determine whether to directly broadcast an emergency notification data packet (see Table 4). The state may be from arrhythmia, abnormal blood pressure, and abnormal blood oxygen but still within the safe range, and then suddenly into state of the messy cadence, the slow-down speed, or even stops, which meets the requirements of automatic notification of the state machine technology.

At any time and any place, as long as the state machine calculation meets the requirements of automatic emergency notification, the bracelet can automatically broadcast its own emergency help information packet (see Table 4) to the base station, and also to nearby runners or volunteers. It can be directly transferred to other runners via Location based MESH-network technology until it reaches the next BLE Mat or volunteers nearby. Therefore, it may guarantee that rescue personnel will arrive within 30 sec or even within 10 sec.

The automatic notification broadcasts with the highest power of the bracelet Bluetooth 5.0, as shown in the automatic emergency notification data packet in Table 4, which may arrive directly at the nearest base station, and also transmit to the bracelet of the contestant passing by; and also ask for help from nearby rescue volunteers or personnel. It will continue broadcasting until the volunteers or personnel come. Because of the broadcast method, the mobile phone of volunteers or personnel can be informed by APP or Web of the distance to the rescue requester. The closer to the rescue requester, the RSSI (Received Signal Strength Indications) will become stronger; otherwise, it will become weaker, which is very consistent in open areas. This embodiment can reduce the number of rescue volunteers or personnel. For example, in a 42-km marathon, as long as there are 84 rescue volunteers or personnel on the track, it can be deployed 250 m between two base stations (one every 500 meters). As long as the bracelet transmits 125 meters, it can reach the nearby rescue volunteers or personnel, which is very easy for the communication distance of Bluetooth 5.0 and above.

TABLE 4

| data packet for automatic emergency notification | | | | | | | |
|---|---|---|---|---|---|---|---|
| recognition code 2 byte | MAC address 6 byte | time 3 byte | place 4 byte | things 2 byte | things 1 byte | thing 1 byte | thing 2 byte |
| $A Automatic | | hour minute second HH MM SS | latitude and longitude of previous base station | step number counted from previous base station | heart rate 0-255 | blood oxygen 0-100 | blood pressure 0-255 0-255 |

In summary, the present invention uses a wearable device to pass a signal transceiver in a race path, and the signal transceiver receives the time synchronization control signal of the gateway, which significantly reduces the inaccurate timing of the race due to time synchronization, inaccurate position analysis calculations, and delays in accident rescue.

Although the present invention has been disclosed as above with the examples, it is not intended to limit the present invention. Any person with ordinary knowledge in the technical field can make some modifications and retouching without departing from the spirit and scope of the present invention. The protection scope of the present invention shall be determined by the scope of the attached patent application.

What is claimed is:

1. A method of marathon timing and real-time accident notification, comprising:
   providing a marathon event management system which has a database connected to a gateway, and the gateway is connected to a time synchronization control unit;
   providing a wearable device to at least one contestant, the wearable device having a sensing element for sensing the physiological parameters and environmental parameters of the contestant, a signal transceiving unit and a power source which is electrically connecting the sensing element and the transceiving unit;
   defining a start position, a travel area, and an end position in the marathon's travel path, wherein a plurality of signal transceivers are arranged on the traveling paths to continuously transmit and receive the physiological parameters and the environmental parameters of the wearable device within a cycle time;
   wherein the gateway comprises: a satellite positioning receiving module for receiving/transmitting a GPS positioning data to the time synchronization control unit, and at least one control signal sent by the time synchronization control unit to a plurality of signal transceivers arranged on a traveling path; and
   when the contestant passes any signal transceiver in the travel path, the signal transceiver actively judges the RF intensity signals generated by the contestant during the cycle time, if the multiple RF intensity signals occur at least one attenuation, and the attenuation value of any one of the RF strength signals exceeds a threshold, then the time point for the contestant to pass the signal transceiver is calculated.

2. The method of the claim 1, further comprising:
   sending a rescue medical service request based on the sensed physiological parameters and environmental parameters and the signal which is converted into a data packet and transmitted to a cloud management system.

3. The method of the claim 1, further comprising:
   capturing at least one step data of the contestant which is calculated to determine the at least one cadence data of the contestant, and integrated into a physiological parameter.

4. The method according to claim 3, wherein the wearable device further comprises:
   a behavior detection module for capturing the at least one cadence data of the contestant;
   a behavior learning module which is used to analyze whether the contestant has an accident according to the at least one cadence data, the physiological parameters and the environmental parameters.

5. The method of the claim 1, wherein the physiological parameters include at least one or a combination of heartbeat information, blood glucose information, lactic acid information, integrated temperature information, blood oxygenation information, and body posture information of the contestant.

6. The method of claim 1, wherein the environmental parameters include at least one or a combination of longitude information, latitude information, altitude information, environmental noise information, temperature information, and humidity information.

7. The method of claim 1, wherein the cycle time is between 5 ms and 30 ms.

8. The method according to claim 1, wherein the signal transmitting and receiving unit transmits and receives through a Bluetooth, a Bluetooth low energy signal, a WIFI signal, an LTE signal, or a 5G signal.

9. The method of claim 1, wherein the time synchronization control unit sends a time synchronization control signal to the gateway every 1 second to 30 minutes, and the gateway sends the time synchronization control signal to the signal transceivers at the same time.

10. A method of marathon timing and real-time accident notification, comprising:
    providing a marathon event management system which has a database connected to a gateway; and the gateway is connected to a time synchronization control unit; the gateway further includes: a satellite positioning receiving module for receiving/transmitting a GPS positioning data to the time synchronization control unit, and at least one control signal sent by the time synchronization control unit to a plurality of signal transceivers arranged on a traveling path;

providing a wearable device to at least one contestant, the wearable device having a sensing element for sensing the physiological parameters and environmental parameters of the contestant, a signal transceiving unit and a power source, and electrically connecting the sensing element and the transceiving unit;

defining a start position, a travel area, and an end position in the marathon's travel path, wherein a plurality of signal transceivers are arranged on the traveling paths to continuously transmit and receive the physiological parameters and the environmental parameters of the wearable device within a cycle time; when the contestant appears in the travel path that the physiological parameter and the environmental parameter exceed a preset value, the wearable device of the contestant transmits the physiological parameter and the environmental parameter and/or a rescue medical service request signal to a wearing device of other contestants passing the position of the contestant requesting rescue; and when the said other contestant passes any signal transceiver in the travel path, the signal transceiver may actively determine the RF intensity signals generated by the said other contestant during the multiple cycle times; when the multiple RF intensity signals occur attenuate at least once and the attenuation value of any one of the RF strength signals exceeds a threshold, then calculate the time point for the said other contestant to pass the signal transceiver.

11. The method of claim 10, further comprising:
sending a rescue medical service request based on the sensed physiological parameters and environmental parameters and the signal which is converted into a data packet and transmitted to a cloud management system.

12. The method of claim 10, further comprising:
capturing at least one step data of the contestant which is calculated to determine the at least one cadence data of the contestant, and integrated into a physiological parameter.

13. The method according to claim 12, wherein the wearable device further comprises:
a behavior detection module for capturing the at least one cadence data of the contestant; and
a behavior learning module is used to analyze whether the contestant has an accident according to the at least one cadence data, the physiological parameters and the environmental parameters.

14. The method of claim 10, wherein the physiological parameters include at least one or a combination of heartbeat information, blood glucose information, lactic acid information, integrated temperature information, blood oxygenation information, and body posture information of the contestant.

15. The method of claim 10, wherein the environmental parameters include at least one or a combination of longitude information, latitude information, altitude information, environmental noise information, temperature information, and humidity information.

16. The method of claim 10, wherein the cycle time is between 5 ms and 30 ms.

17. The method according to claim 10, wherein the signal transmitting and receiving unit transmits and receives through a Bluetooth, a Bluetooth low energy signal, a WIFI signal, an LTE signal, or a 5G signal.

18. The method of claim 10, wherein the time synchronization control unit sends a time synchronization control signal to the gateway every 1 second to 30 minutes, and the gateway sends the time synchronization control signal to the signal transceivers at the same time.

19. A system of marathon timing and instant accident notification, comprising:
a marathon management system, which has a database connected to a gateway; and the gateway is connected to a time synchronization control unit; the gateway further includes: a satellite positioning receiving module for receiving/transmitting a GPS positioning data to the time synchronization control unit, and at least one control signal sent by the time synchronization control unit to a plurality of signal transceivers arranged on a travel path;

when the contestant's signal transceiving unit in the travel path senses the physiological parameter and the environmental parameter exceeding a preset value, the signal transceiving unit sends a rescue medical service request signal to at least one of the signal transceiver, and a wearable device, wherein the wearable device comprises:
one power supply;
a processor electrically connected to the power source;
a sensing element for sensing a physiological parameter and an environmental parameter of a contestant, and the sensing element is electrically connected to the power source;
a storage unit for storing at least the physiological parameters and the environmental parameters sensed by the contestant; and
a signal transceiving unit for continuously transceiving the physiological parameters and the environmental parameters of the wearable device within a cycle time;
the travel path includes at least a start position, a travel area, and an end position;
wherein the signal transceivers disposed on the travel path are used to continuously transmit and receive the physiological parameters and the environmental parameters of the wearable device within a cycle time; when the contestant appears in the travel path that the physiological parameter and the environmental parameter exceed a preset value, the signal transceiver unit sends a rescue medical service request signal to at least one of the signal transceivers, and when the contestant passes any signal transceiver in the travel path, the signal transceiver may actively judge the RF intensity signals generated by the contestant during the cycle time; when the plurality of RF intensity signals are attenuated at least once, and if the attenuation value of any one of the RF strength signals exceeds a threshold value, the time point of the contestant passing through the signal transceiver is calculated; or
wherein the signal transceivers disposed on the travel path are used to continuously transmit and receive the physiological parameters and the environmental parameters of the wearable device within a cycle time; when the contestant appears in the travel path that the physiological parameter and the environmental parameter exceed a preset value, the wearable device of the contestant transmits the physiological parameter and the environmental parameter and/or a rescue medical service request signal to a wearing device of other contestants passing the position of the contestant requesting rescue; and when the said other contestant passes any signal transceiver in the travel path, the signal transceiver may actively determine the RF intensity signals generated by the said other contestant during the multiple cycle times; when the multiple RF intensity signals occur attenuate at least once and the attenuation value of any one of the RF strength signals exceeds a threshold, then calculate the time point for the said other contestant to pass the signal transceiver.

\* \* \* \* \*